May 2, 1967     J. W. DIXON     3,317,209

EDUCATIONAL DEVICE

Filed Dec. 22, 1964

INVENTOR
John W. Dixon

BY *Walter B. Murray*
ATTY.

United States Patent Office 3,317,209
Patented May 2, 1967

3,317,209
EDUCATIONAL DEVICE
John W. Dixon, 224 Ireland Ave.,
Cincinnati, Ohio 45218
Filed Dec. 22, 1964, Ser. No. 420,307
4 Claims. (Cl. 273—109)

The present invention relates to an educational device and is particularly directed to a manually gyratable action toy that will be entertaining to children whilst teaching them atomic structure and the operating principles within the atom.

An object of the invention is to provide an action toy comprising a plurality of balls that are independently rotatable in a number of transparent, semi-spherical shells, and which will call upon the skill and ingenuity of the child to produce an infinite variety of gyrating, ball motions.

Another object of the invention is to provide an action toy which in operation will simulate the atomic structure and operating principles and visually demonstrate the planetary movements of electrons around the nucleus of the atom.

A further object of the invention is to provide a simplified and inexpensive yet rugged educational toy having the foregoing characteristics.

Other and further objects of the invention will become apparent from the following specification taken in conjunction with the accompanying drawing, wherein.

Figure 2:
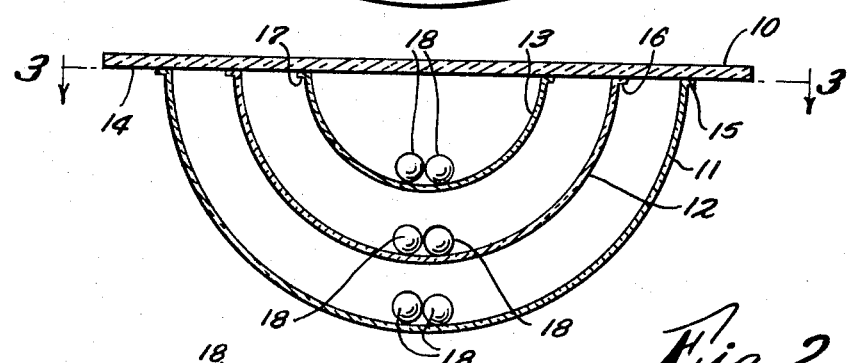
FIG. 2 is a section taken on line 2—2 of FIG. 1.
Figure 3:
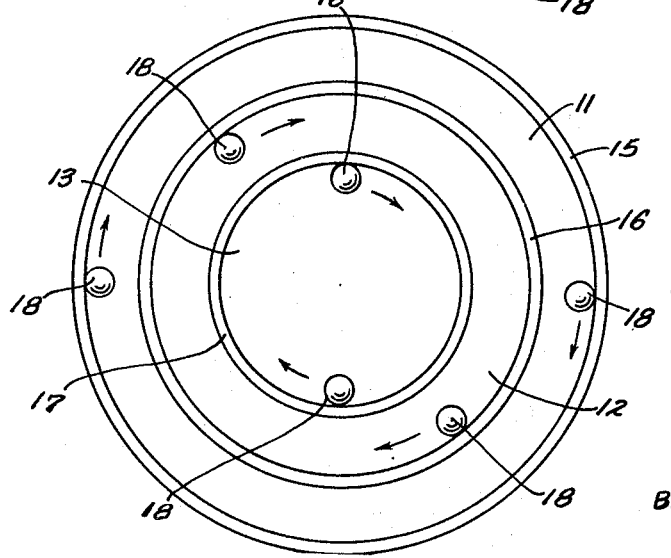
FIG. 3 is a section taken on line 3—3 of FIG. 2, showing the educational toy in an operating condition.

With particular reference to the drawings my educational device has a base plate 10 in the form of a transparent disc preferably made of a relatively thick, non-breakable plastic material. Three bowl shaped shells 11, 12 and 13 of different sizes are fixed to one major face 14 of the base plate in spaced apart, nested positions and, as best shown in FIGS. 2 and 3, each shell has a semi-spherical configuration and is made of a relatively thin, transparent plastic material. The shells are preferably positioned concentrically with each other, with their common center lying in the axis of the base plate 10.

The upper edge of each of the shells 11, 12 and 13 is turned outwardly at right angles from the body of the shell to form a integral, peripheral flange 15, 16 and 17, respectively, which provides an annular, planar surface that is cemented by a suitable plastic cement to the major face 14 of the base plate.

One or more heavy steel balls 18 are disposed in the spaces between the outermost shell 11 and the intermediate shell 12, the intermediate shell 12 and the inner shell 13 and the inner shell 13 and the base plate 10, it being understood that the number of shells and the number of balls in each shell may vary according to the kind of atomic structure to be visually demonstrated with my action toy.

It is contemplated that my educational toy can be manually operated to visually simulate the planetary movements of electrons as they revolve around the nucleus of a particular atom. For instance the device depicted in the drawings illustrates the structure of the carbon atom wherein three pairs of steel balls 18 represent the six (6) carbon electrons while each of the three transparent shells define the three orbital paths for each pair of electrons, the common centers of the base plate and the shells defining the position of the nucleus of the carbon atom. The heavy steel balls when in motion within their respective shells demonstrate the centrifugal force that exists in the atomic structure.

Figure 1:
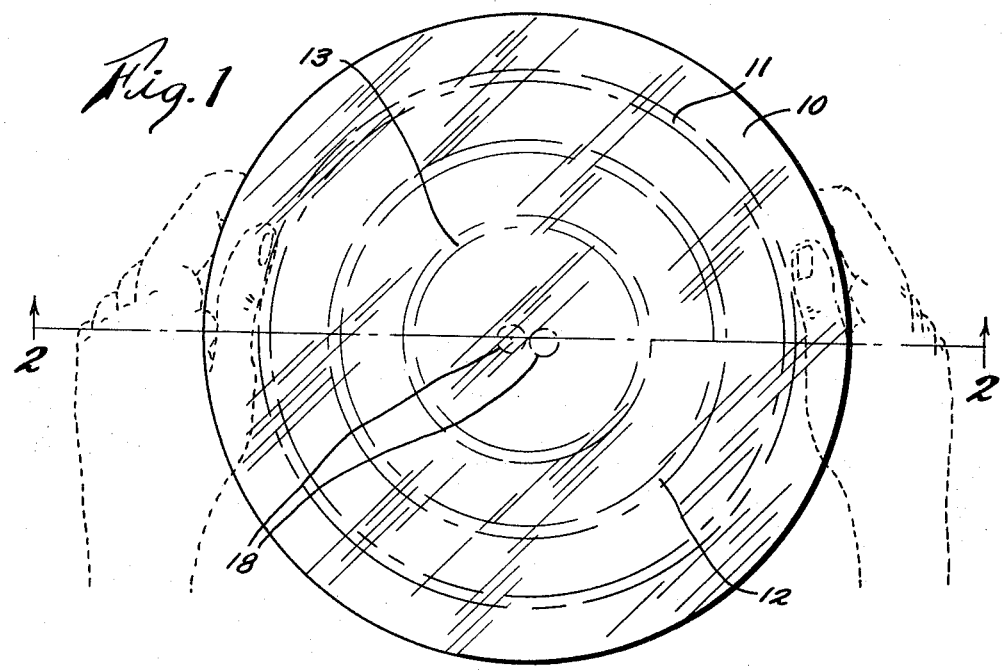
FIG. 1 is a plan view of the educational toy showing in dotted lines how it is handled by a child.

A child holding the opposed sides of the outer edge of the base plate 10 for the device in both hands in the manner shown in dottel lines in FIG. 1 begins with a slow circular motion which causes the steel balls to revolve within their respective shells, the circular motion being increased in speed until the balls appear to fly around their shells with relatively great speed. While the balls are moving in their orbital paths the device is manually raised so that the eye is level with the underside of the base plate whereby the transparent shells will not be observable and the device will truly demonstrate visually the orbital paths of the electrons as the balls rotate within their planetary paths around the atom nucleus.

To simulate the structure of atoms other than the carbon atom the number of shells may be increased and the sizes of the shells either increased or decreased whilst the number of steel balls on each shell may also be varied. For instance, to simulate the beryllium atom, only two shells are required with two electrons in each shell whilst in such atomic structures as the iron atom 26 steel balls would be used and perhaps 7 or 8 shells cemented concentrically to the under side of the base plate.

Having described my invention what I claim as new is:

1. An educational toy comprising a base plate, a plurality of thin, transparent bowl-shaped shells, means securing the rim of each shell to one major face of the base plate, said shells being disposed on the plate in spaced apart, nested positions, and a relatively heavy opaque ball freely removable in each shell.

2. An educational toy comprising a disc shaped plate, a plurality of thin, transparent semi-spherical shells, means securing the rim of each shell to one major face of the disc shaped plate, said shells being disposed on the plate in spaced apart, concentric positions with their common axis lying in the center of the plate, and a relatively heavy, opaque ball freely movable in each shell.

3. An educational toy consisting of relatively thick, transparent and disc-shaped base plate, a plurality of relatively thin, transparent semi-spherical shells, means securing the rim of each shell to one major face of the plate, said shells being disposed on the plate in spaced apart, concentric positions with their common axis lying in the center of the plate and a plurality of relatively heavy opaque balls freely movable in each shell.

4. An educational toy as set forth in claim 3 characterized by the fact that the means securing the rim of each shell to one major face of the plate comprises an outturned, annular flange formed on the rim of each shell, and plastic cement means for securing each annular flange to said major face of the plate.

References Cited by the Examiner

UNITED STATES PATENTS

| | | | |
|---|---|---|---|
| 2,747,196 | 5/1956 | Kaye | 46—43 X |
| 2,969,237 | 1/1961 | Rogers | 273—113 |
| 3,183,608 | 5/1965 | Jierree | 35—18.5 |
| 3,204,964 | 9/1965 | Geary | 273—109 |

RICHARD C. PINKHAM, Primary Examiner.

S. NATTER, Assistant Examiner.